United States Patent [19]
Schurman

[11] 3,828,969
[45] Aug. 13, 1974

[54] PLASTIC CONTAINER
[75] Inventor: Peter T. Schurman, Woodbridge, Conn.
[73] Assignee: The Plastic Forming Company, Inc., Woodbridge, Conn.
[22] Filed: Oct. 4, 1971
[21] Appl. No.: 186,356

Related U.S. Application Data
[62] Division of Ser. No. 9,529, Feb. 9, 1970.

[52] U.S. Cl. .................. 220/31 S, 292/258, 49/397
[51] Int. Cl. ............................................. B65d 43/16
[58] Field of Search ......... 220/31 S, 31 R, 9 R, 9 F, 220/31; 16/DIG. 13; 292/246, DIG. 38, 258; 49/381, 383, 397

[56] References Cited
UNITED STATES PATENTS
| | | | |
|---|---|---|---|
| 2,373,852 | 4/1945 | Rappaport | 220/31 S X |
| 2,762,076 | 9/1956 | Kiba | 220/31 S |
| 3,339,781 | 9/1967 | Schurman et al. | 220/31 S X |
| 3,490,805 | 1/1970 | DiPierro et al. | 292/258 |
| 3,730,576 | 5/1973 | Schurman | 292/DIG. 38 |

Primary Examiner—William I. Price
Assistant Examiner—Steven M. Pollard
Attorney, Agent, or Firm—Christel & Bean

[57] ABSTRACT

A plastic container having blow-molded cover and body parts and compression molded interfitting hinge parts formed integral therewith providing hinge pin bearing sections of double wall thickness. A latch also is provided.

11 Claims, 10 Drawing Figures

PATENTED AUG 13 1974 3,828,969
SHEET 1 OF 4
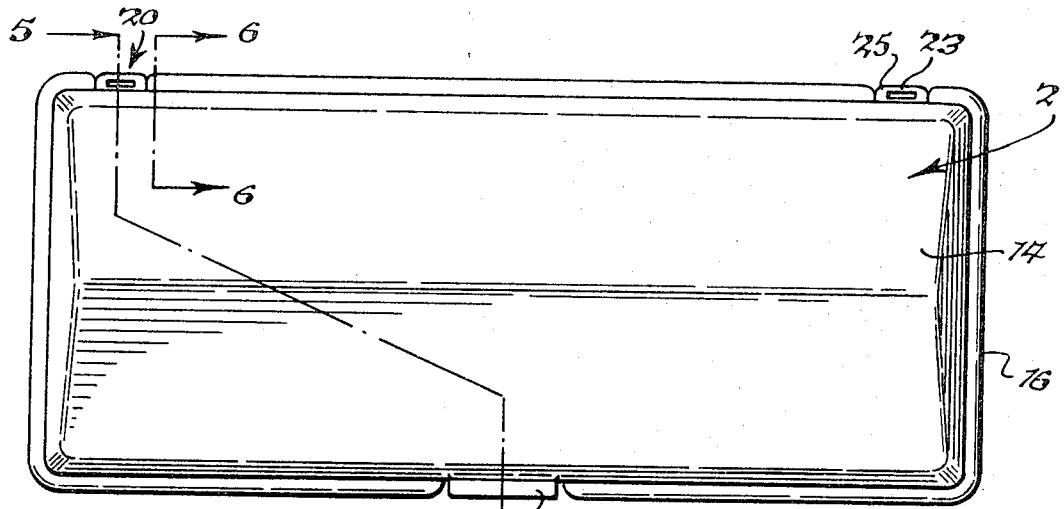
Fig. 1.
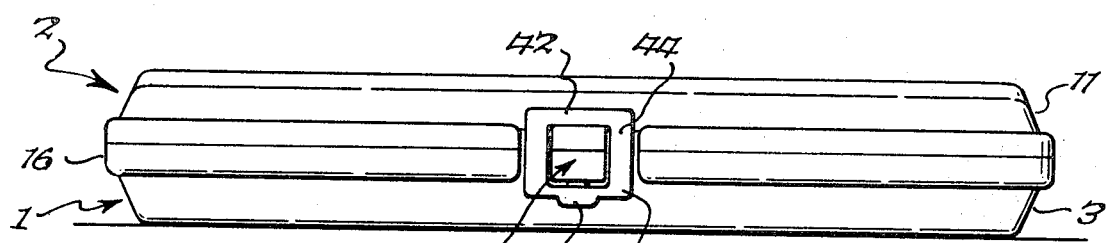
Fig. 3. Fig. 2.
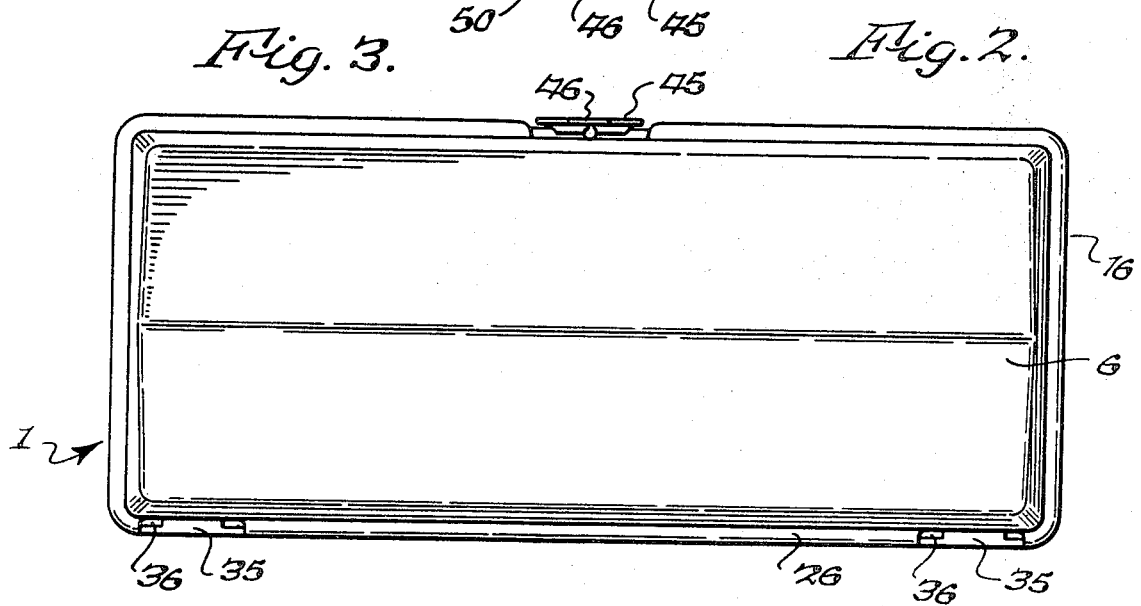
Fig. 4.
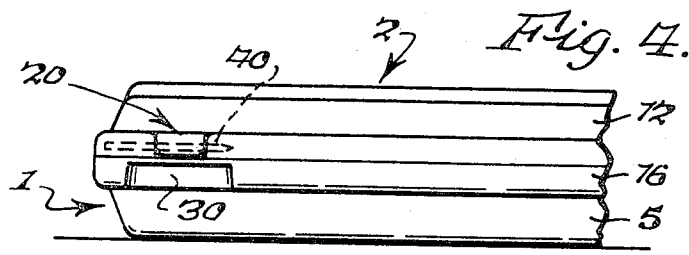

PLASTIC CONTAINER

CROSS-REFERENCE TO A RELATED APPLICATION

This is a division of U.S. Pat. Ser. No. 9,529 filed Feb. 9, 1970 in the name of Peter T. Schurman for Plastic Container and Method of and Apparatus for Molding the Same.

BACKGROUND OF THE INVENTION

This invention relates generally to the container art, and more particularly to a new and useful hinge for joining cover and body parts blow-molded of thermoplastic material.

The provision of a container body separate from its cover has certain advantages in production, and in the fact that it permits merchandise to be shrink-wrapped in the body prior to application of the cover. It also permits the utilization of different materials, and materials of different color, in forming the cover and body.

Blow-molding such container parts is itself quite desirable from various points of view. For example, the provision of a container body, and cover of hollow, double-wall construction provides a cushioned arrangement, wherein the inner wall can be shaped to engage and receive the article being packaged. However, a problem arises in the hinging of such blow-molded container parts because, while it is possible to blow-mold hinge pin receiving portions, such wall portions are apt to tear if the cover is swung open beyond its intended full open position. A considerable leverage is inherent in such constructions, whereby carelessness in opening the cover can readily rupture the wall through which the hinge pin extends, destroying not only the hinge but the container as well.

A problem also is presented in providing a suitable latch for such hinged container parts. Where the latch is molded as part of the container cover, it imposes limitations with respect to manufacture. Where the latch is separate from the container, it must be attached thereto in a manner which does not interfere with the economical production of such containers and which will firmly secure the latch to the container and preferably in a manner which avoids unnecessary stressing of the latch thereby to provide a durable construction.

SUMMARY OF THE INVENTION

Accordingly, the primary object of this invention is to provide, for blow-molded container parts, a pinned hinge construction which will effectively resist the destructive forces normally encountered in use.

Another object of this invention is to provide the foregoing in a construction permitting each container part and its hinge portion to be molded substantially simultaneously and without complication.

It is also an object of this invention to provide a latch for a hinged container, which latch is characterized by its ease of manufacture and assembly, and by its simplicity and durability in use.

BRIEF DESCRIPTION OF THE DRAWING FIGURES

FIG. 1 is a top plan view of an illustrative container embodying my invention;
FIG. 2 is a view thereof in front elevation;
FIG. 3 is a bottom plan view thereof;
FIG. 4 is a fragmentary, rear elevation thereof, showing the pinned hinge of my invention;
FIG. 5 is a sectional view, on an enlarged scale, taken about on line 5—5 of FIG. 1, parts being broken away for convenience in illustration;
FIG. 6 is a fragmentary sectional view, on an enlarged scale, taken about on line 6—6 of FIG. 1;
FIG. 7 is a fragmentary sectional view through the pinned hinge of my invention, taken about on line 7—7 of FIG. 5;
FIG. 8 is a fragmentary sectional view showing the latch of my invention, taken about on line 8—8 of FIG. 5;
FIG. 9 is a sectional view through a mold used in forming the container of FIG. 1; and
FIG. 10 is a schematic illustration of an apparatus used in forming the container of this invention.

DETAILED DESCRIPTION OF THE ILLUSTRATED EMBODIMENT

A. In General

Figure 5:
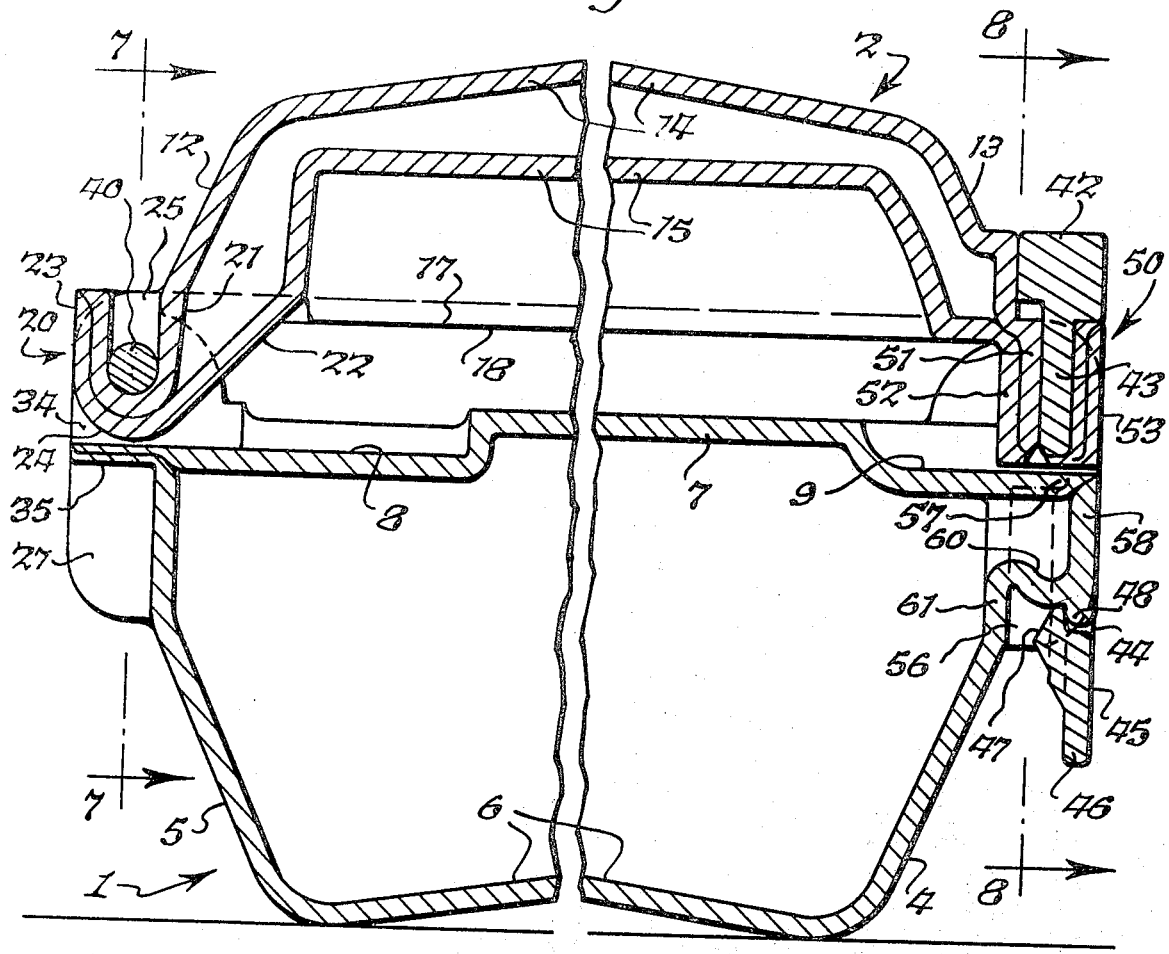

The illustrative container depicted in the accompanying drawings comprises a base or body, generally designated 1, and a lid or cover, generally designated 2. Body 1 is a hollow, double-wall construction formed by an outer shell having opposite end walls 3, a front wall 4, a rear wall 5 and a bottom wall 6, and an inner shell 7 extending across the upper end of the outer shell in spaced relation thereto except adjacent the edge portions thereof and formed to provide recessed compartments as indicated at 8 and 9. It will be appreciated that inner shell 7 can be otherwise compartmented, and that the bottom walls of any of the compartments can be removed to provide access to the interior of body 1 between the inner and outer shells, for storage or any other purpose.

Cover 2 also is a hollow, double wall construction, being formed by an outer shell having opposite end walls 11, a rear wall 12, a front wall 13 and a top wall 14, and an inner shell 15 extending across the outer shell in spaced relation thereto except adjacent the edge portions thereof. While the illustrated inner shell 15 is shown as having a simple recessed formation, it will be appreciated that inner shell 15, like the inner shell 7 of body 1, can have any desired configuration. Cover 2 could be injection molded if inner shell 15 is omitted.

The outer shell of body 1 is formed to provide an outwardly offset band 16, extending horizontally around body 1 adjacent the upper end thereof and the juncture of the outer shell with inner shell 7, which juncture defines a ledge 17 slightly inwardly recessed relative to the upper edge of band 16. The juncture between the inner and outer shells of the cover define a ledge 18, fitting within band 16 and abutting ledge 17 in the closed position of the container.

B. The Hinge

It is a particular feature of my invention that cover 2 and body 1, which are blow-molded in a manner to be described hereafter, are formed with integral, interfitting hinge pin receiving portions of substantial strength. In the illustrated embodiment, cover 2 and body 1 each have a pair of hinge portions, which nest one within the other to receive a pair of hinge pins. More particularly, cover 2 is formed with a pair of hinge extensions, generally designated as 20 which depend from recessed ledge portion 19 and are of generally U-shaped transverse section, as clearly seen in FIG. 5. Extensions 20 are formed by generally U-shaped extended wall portions 21 and 22 of the outer and inner cover shells, respectively, which extended wall portions 21 and 22 abut at the bottom of the U-shaped extension 20 and maintain such abutting relation in forming the upstanding outer leg 23 thereof. In other words, the inner leg of the U-shaped channel of each hinge extension 20 is provided by the depending outer shell wall extension 21 which continues around the bottom of the channel and upwardly along the outer leg 23 being joined at the bottom of the channel and in the outer leg by the inner shell extension 22 to provide an outer leg 23 and a channel bottom wall 24 of double wall thickness, being substantially twice the thickness of the walls defining the inner and outer shells of cover 2.

In addition to the foregoing, the opposite ends of the hinge channel are closed by opposite end walls 25 (FIG. 7) which depend from the recessed ledge portion 19, are formed integral with cover 2, and can be substantially double the wall thickness of the inner and outer cover shells, as shown, but often are further compressed to a lesser thickness.

Thus, there are provided a pair of channel shaped extensions 20, closed at their opposite ends and strengthened by reason of the double thickness of bearing wall portions 23 and 24, which portions together with end walls 25 are provided by folding portions of the tubular parison upon themselves in a manner which will be described in detail hereafter.

Container body 1 also is provided, in the illustrated embodiment, with a pair of hinge pin receiving portions which receive the cover hinge portions 20 in interfitting relation. The body hinge portions are provided by extending the bottom wall 26 of offset band 16 upwardly, at spaced points as shown at 27 in FIG. 7, until it abuts the top wall 28 of band 16, the bottom wall then being extended inwardly of the recess 30 thus formed, along the underside of top wall 28 as shown at 31, thereby providing bearing wall portions of double thickness.

Top and bottom wall portions 28, 31 lead to downwardly extending wall portions 32, 33, respectively, defining a pair of end walls which can be of double wall thickness, as shown, but often are further compressed to a lesser thickness. End walls 34 are joined by a bottom wall 35 formed by horizontal extensions of the end walls 32 and 33, as clearly shown in FIG. 7. Wall 35 is not a bearing wall, and therefore can be compressed in forming to a relatively thin section.

Figure 6:
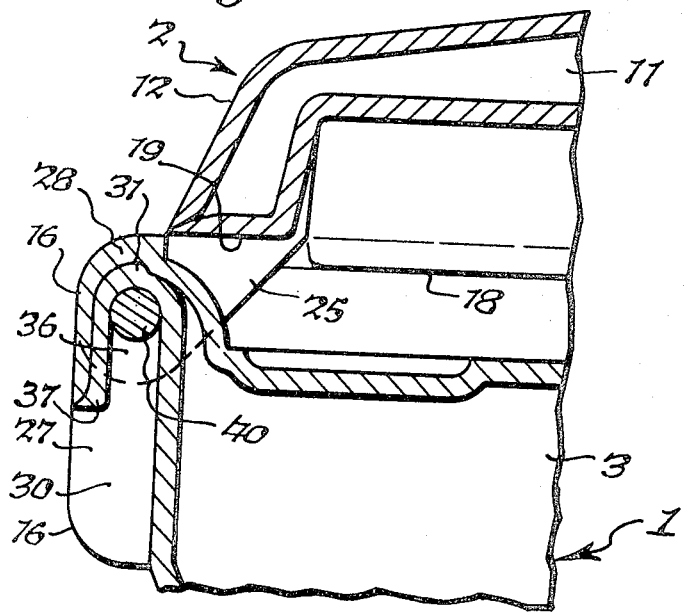

It will be observed that end walls 34 and the upper portions of walls 27, define between them a pair of pockets 36, which are themselves recessed, relative to the recess 30. As seen in FIG. 6, the outer face of pockets 36 is provided by the outer wall of band 16 and an abutting, downward extension 37 of top wall 31.

Thus, body 1 is formed, in a manner to be described, to provide hinge pin bearing portions 28, 31 and 37, 16, of double wall thickness, whereby the same are reinforced and materially stronger than the single wall portions of the container.

Figure 7:
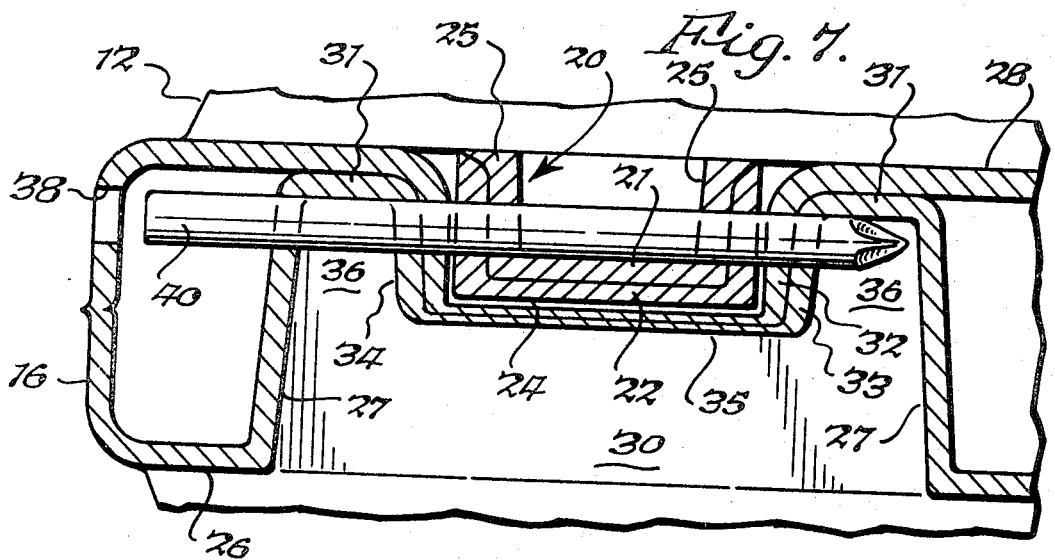

When cover 2 and body 1 are assembled, the cover hinge extensions 20 fit between end walls 34, as clearly shown in FIGS. 4 and 7. Holes are drilled or otherwise formed through the outer wall of band 16 at opposite ends of the container, as shown at 38, and similar holes are provided in alignment therewith through walls 27, 34 and 25, as shown in FIG. 7. While aligned holes could be drilled through the innerwalls 27, that is not necessary because the hinge pin need not extend that far. Where the holes are drilled, hinge pins 40 of any suitable configuration and type are inserted through the openings 38 and the internal aligned openings, so as to pass through the various wall portions of the hinge pin receiving sections as clearly shown in FIG. 7, it being understood that the identical arrangement, in reverse, is provided at the opposite end of the container. For smaller boxes, the hinge pin receiving holes are formed by driving the hinge pins through the various wall portions.

In use, hinge pins 40 and openings 38 become slightly misaligned, whereby hinge pins 40 are effectively trapped within the container body.

It will be noted that the pointed, inner end of each hinge pin 40 extends beyond the innermost wall 34 at a distance greater than the spcaing between the opposite end of pin 40 and the outer wall of band 16, whereby even if the pin should shift axially into engagement with the outer band wall there will be no disengagement of the hinge pins with its associated hinge parts. Also, in use the hinge pins are not normally subject to axially directed displacing forces.

While a simple, ordinary nail can be used as the hinge pin, with the pointed end facilitating passage of the pin through the various aligned openings, it will be appreciated that simple cylindrical stock of any suitable nature can be used, and indeed the pin need not even be cylindrical.

This construction provides a simple, readily fabricated hinge of surprising strength because of its utilization of hinge pin bearing wall sections of double thickness. If cover 2 is swung from its closed position in FIG. 5 to a full open position, and then urged beyond that position by a force applied to the front wall 13, it will be appreciated that the leverage provided by cover 2 will cause a considerable force to be exerted on the container wall portions surrounding hinge pins 40. If the hinge pin receiving walls were not reinforced by the adjacent bearing wall sections, they would be severely stressed and in many instances could not withstand such forces but would rupture, thereby destroying the integrity of the container. However, by providing hinge pin bearing wall sections, I have found that the pin receiving walls will withstand severe forces, far beyond those to be expected even with careless handling of the container. The hinge pin receiving walls 34, 25 are thereby reinforced against tearing. The double wall thickness of cover hinge portions 23 and 24 and of the body portions 28, 31 is important in effectively resisting such tearing forces. Portions 23 and 28, 31 are bearing walls against which hinge pins 40 engage when cover 2 is swung beyond full open position and when cover 2 is in an open position and subject to forces tending to pull it away from body 1. Such forces also might be encountered with the cover in closed position, for example if the container is dropped or subjected to other forms of impact, and these forces tending to separate the closed cover from the body are effectively resisted by the double thickness of the hinge pin bearing wall sections 24 and 28, 31. Walls 37 also bear against pins 40 when cover 2 is swung beyond full open position and, being of double thickness because of the outer wall of band 16, aid in resisting such tearing forces. While pins 40 need not normally engage against the bearing walls 23, 24, 31 and 37, they should be positioned closely adjacent the same to bear thereagainst substantially immediately upon being subject to such forces.

While the hinge pin receiving wall portions 25, 34 often will be compressed to less than normal double wall thickness, in order to facilitate insertion of pins 40 therethrough, they continue to reinforce the bearing walls to which they are connected. Also, the degree of compression of these walls is controllable, as will become apparent.

C. The Latch

Figure 8:
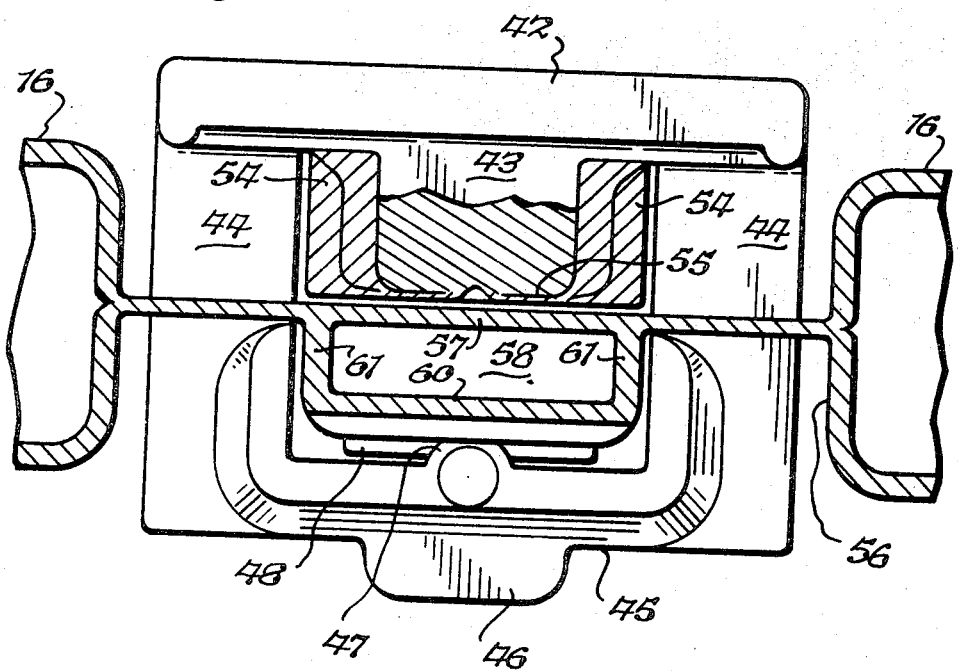

A latch also is provided, to releasably lock cover 2 in closed position relative to body 1. In the illustrated embodiment, such latch is of generally rectangular configuration and includes a generally horizontal anchor bar portion 42 (FIGS. 5 and 8) of substantial thickness. Anchor bar 42 is generally rectangular in cross-section and has an anchor tab 43 depending from the central portion thereof. A latching bail of generally U-shaped configuration comprises a pair of side legs 44 depending from opposite ends of anchor bar 42, legs 44 being joined at their lower extremities by a horizontal latching bar portion 45 which has a finger tab 46 depending centrally therefrom. A locking tab 47 extends upwardly from the central portion of latch bar 45, for snapfit engagement behind a shoulder 48 provided on the container body as will be described.

It will be noted that legs 44, latching bar 45 and tab 46 lie in a plane substantially coplanar with the outer face of the anchor bar 42. Anchor tab 43 and locking tab 47, on the other hand, are inwardly offset and lie in a plane parallel to that of the legs 44.

Cover 2 is provided with a latch anchor extension, generally designated 50 and comprising wall portions 51 and 52 extending from the outer and inner cover shells, respectively, and depending below ledge 18 in side-by-side relation. Walls 51, 52 are joined to an outwardly spaced front wall 53 by opposite end walls 54 which along with front wall 53 comprise extensions of wall portions 51 and 52. The walls 51, 52, 53 and 54 define a pocket receiving the anchor tab 43, which pocket can be closed at its lower end, as by a thin web section 55 or can be open, as desired. While pocket 51-54 is formed by folding parison portions upon themselves, as will be described, the pocket walls can be compressed to less than double wall thickness. In assembling the latch, anchor tab 43 is fitted into cover pocket 51-54 with a relatively snug fit and welded to the bottom thereof by the momentary application of heat, fusing together the plastic material of anchor tab 43 and the adjacent cover wall.

In body 1, outwardly offset band 16 is discontinuous adjacent the latch, having laterally spaced end walls 56 extending inwardly to the plane of the generally vertical upper portion 61 of front wall 4. The inner shell 7 is extended forwardly in the plane of recess 9, as shown at 57, to accommodate latch extension 50 of cover 2. A boxlike embossment spaced between end walls 56 of band 16 is provided by a front wall 58 terminating at its lower end in the latching shoulder 48 whch leads to a bottom wall 60 recessed relative to latching shoulder 48 and extending to the upper portion 61 of front wall 4. A pair of opposite end walls 61 extending between front wall 58 and the upper portion 61 of front wall 4 complete the latching embossment on body 1, which embossment is blow-molded with and as an integral part of body 1.

With the various parts assembled as shown in FIG. 5, it will be noted that latching tab 47 engages behind latching shoulder 48, securely locking cover 2 in closed position, with the latching bail parts 44, 45 lying in their natural plane of repose, whereby they are not under any stress except within theat plane. Any force tending to move cover 2 upwardly, away from body 1 is effectively resisted by engagement of latching tab 47 against wall 60, and tends to embed anchor tab 43 even further within the anchor extension 50. Latching tab 47 is snapped over latching shoulder 48 by flexing members 44, both to release and to latch the container cover. The latch is flexed and bent only during opening and closing, and is not otherwise stressed out of its plane of repose. Therefore, it requires only a suitable tear resistant material, such as polyethlene or polypropylene, having a long flex life. Both the latch and the latch engaging shoulder are molded parts, whereby the dimensions thereof can be easily controlled through proper mold design.

While the foregoing latch is considered highly desirable and advantageous, it will be appreciated that the pinned hinge of this invention is in no way dependent upon or limited to use with this or any other specific latch construction. In like manner, the latch of this invention is in no way dependent upon or limited to use with this or any other specific hinge arrangement, nor does it require a hinged container.

D. Method & Apparatus for Manufacture

Figure 10:
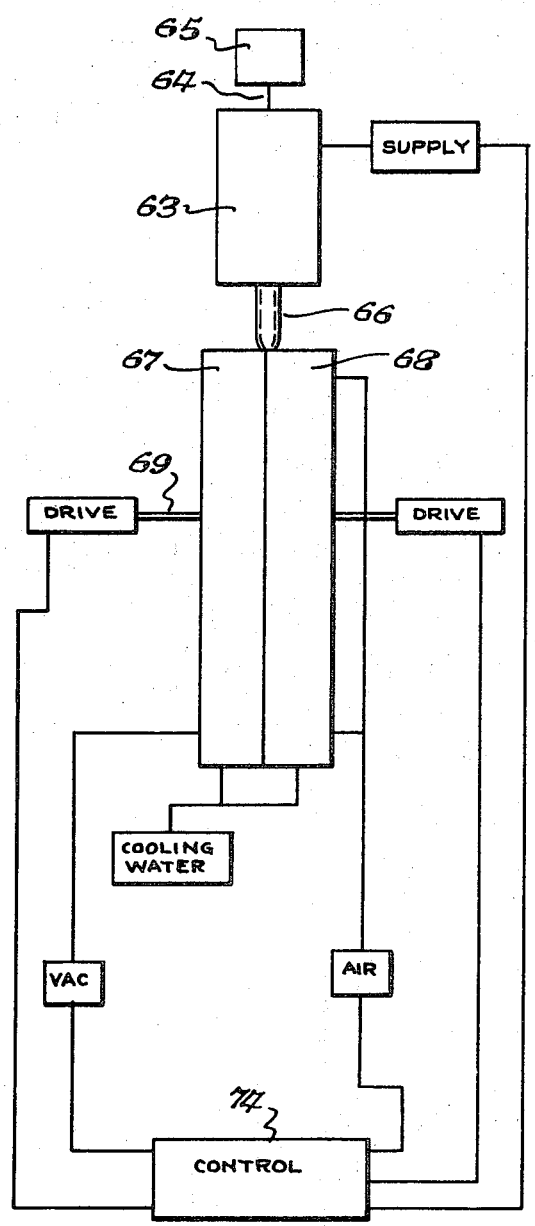

Referring now to FIG. 10, molten plastic material is fed into an extrusion die 63 of known type by conventional feed means, not shown, from a suitable supply. By providing a lift member 64 actuated by a suitable motor 65, die 63 can be adjusted to extrude a parison 66 of the desired wall thickness. The extruded parison 66 is passed between a pair of mold sections 67, 68 which are mounted for movement into and out of engagement about parison 66 by suitable drive means indicated at 69.

Figure 9:
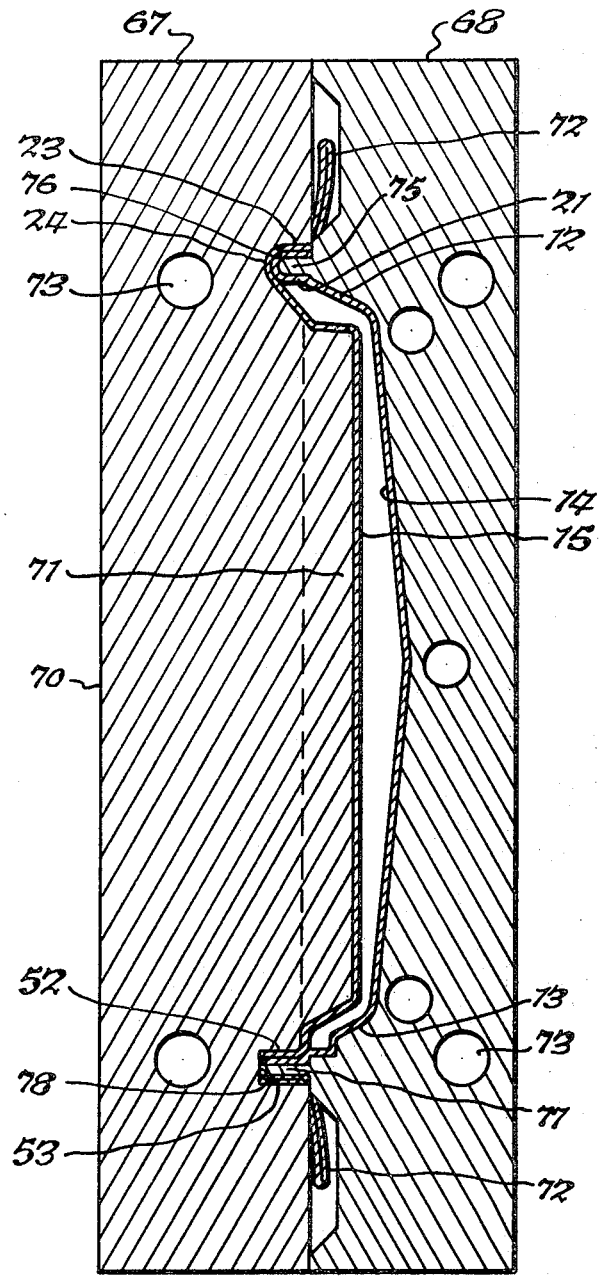

Referring now to FIG. 9, which shows mold sections 67, 68 for forming cover 2, it will be seen that section 67 is a plate section, comprising a body 70 and a core 71 which can be removable in a manner well understood in the art and which has projecting surfaces defining the inner shell 15 of cover 2. Mold section 68 comprises a cavity section, having recessed surfaces defining the outer shell of cover 2, as clearly shown in FIG. 9.

In carrying out the process of my invention, mold sections 67, 68 are engaged about the parison, trapping a portion of the parison between them and having meeting surfaces which sever the extraneous, parison portions as indicated at 72. Compressed air, from a suitable source, is introduced into the trapped portion in a known manner to expand it against the mold surfaces as shown in FIG. 9 and if necessary the spaces between the mold surfaces and the trapped parison portion can be evacuated to preclude inward collapsing of the parison upon itself, all in a manner well understood in the art and schematically indicated in FIG. 10. Cooling water can be circulated through passages indicated at 73, for a purpose well understood in the art, and the mold apparatus can be controlled in a timed manner, by known means indicated at 74 in FIG. 10.

While the steps described thus far are conventional and known in the art, they do not and would not provide the hinge extensions 20 of my invention. It is a particular feature of my invention that rather than attempting to blow-mold the hinge parts, I cause the parison to be folded over upon itself in a manner providing hinge bearing walls of double wall thickness. This is accomplished by providing a projecting finger 75 on cavity mold section 68, which finger can be removable and projects into a recess 76 on plate section 67, the finger 75 and the recess walls being spaced apart a distance substantially equal to twice the parison wall thickness in the closed position of the mold. Finger 75 is spaced from the recess wall at its projecting extremity, its outer side and its opposite ends a distance substantially only twice the parison wall thickness, whereby as these mold sections are engaged about the parison they fold portions of the parison wall upon themselves to form the double wall sections 23, 24, and 25. Finger 75 defines the inner surfaces of walls 24 and 25, and also the inner surface of wall 23 and the outer surface of wall section 21, and these surfaces define between them the outer surface or outline of finger 75, as clearly evident from FIG. 9 viewed in conjunction with FIGS. 5 and 7.

In like manner, the finger receiving recess 76 defines the outer surfaces of walls 23, 24 and 25, and the outer surface of wall 22, and these surfaces between them the outline of recess 76.

As the mold closes, finger 75 forces the adjacent parison wall portion ahead of it, into recess 76 and against the opposing parison wall portion to provide the wall sections of double wall thickness. The hinge extensions 20 are thereby compression molded, integral with cover 2, substantially simultaneously with the blow molding of the latter. Preferably, the parison wall portions forming bearing walls 23 and 24 are compression molded no more than is necessary to achieve the desired double wall thickness. Indeed, the "double" walls 23 and 24 need not fuse but can even be slightly spaced, as long as they are positioned close enough to behave as one wall (of double thickness) against tearing. End walls 25 are similarly formed in the illustrated embodiment. Often, however, they will be compressed to a lesser thickness, to facilitate forming of the pin receiving holes therethrough. This is accomplished by reducing the spacing between the opposite ends of finger 75 and the opposing wall surfaces of recess 76.

While only one finger 75 and matching recess 76 are shown in FIG. 9, it will be appreciated that a second set thereof will be provided, identical with that shown, to provide the second extension 20.

It is contemplated that body 1 will be molded separately from, but in the same manner as cover 2. There will be provided a plate mold section, corresponding to section 67, having projecting surfaces defining inner shell 7 and a cavity mold section, corresponding to section 68, defining the outer shell. Body 1 will be blow-molded, like cover 2, and the hinge portions thereof will be formed by fingers, corresponding to finger 75, on the cavity section defining the outer surfaces of walls 27, 31 and 33, in conjunction with recesses, corresponding to recess 76, on the plate section defining the outer surfaces of walls 28 (adjacent surfaces 31) and 32. These wall surface defining portions of the fingers and their matching recesses are spaced apart a distance substantially equal to twice the parison wall thickness, to provide "double" walls as devined above.

When it is desired to compress walls 34 to a lesser thickness, to faciliate the forming of pin receiving holes therethrough, the spacing between the finger and recess surfaces defining the opposite surfaces of these walls is correspondingly reduced. The fingers and recesses also define the opposite surfaces of walls 35 which latter, however, need not be of double thickness because they are not bearing walls. In this way, the body hinge parts are compression molded integral with body 1, and substantially simultaneously with blow-molding thereof. Since the shape and relative position of the fingers and recesses is shown by the molded article, no further description or illustration is believed necessary.

The latch anchor pocket 50 also is compression molded, being formed by a finger 77 on cavity section 68 projecting into a recess or socket 78 on plate section 67. The side walls of finger 77 and recess 78 are spaced apart to form pocket walls 51, 52, 53 and 54 therebetween. The outer end of finger 77 and the bottom wall of recess 78 can abut, or can be spaced apart to provide web 55. The pocket wall thickness are not critical, whereby the spacing between finger 77 and the walls of recess 78 can be determined by convenience in mold design.

The latch 42–47 can be injection molded, but preferably will be compression molded. Being separate from the container body and cover, it can be formed of a different plastic material, or perhaps the same material in a contrasting color. Usually, however, it will be found convenient to compression form the latch simultaneously with forming of the cover or body parts, and this can be done by providing appropriate cavity faces in the mold sections 67 and 68, designed to receive the severed portion 72 of the trapped parison, and to mold it into one or more latches. It is believed that no further description is necessary, and that the method of forming the latch 42–47 will be obvious to those skilled in the art, from the foregoing.

Accordingly, it is seen that my invention fully accomplishes its intended objects. There is provided a blow-molded container having hinged parts, with a compression molded hinge formed integral with and substantially simultaneously with the forming of the container parts. The compression molded hinge portions provide hinge pin bearing walls of substantial strength, to effectively resist the destructive forces apt to be encountered in use. The container parts, including the latch can be made of any suitable thermoplastic material, such as high density polyethylene, polypropylene, polyvinly and elastomeric polyolefin, which are given by way of example only. The hinge pins normally will be of metal, although other suitable materials could be used. While I have disclosed and described in detail only one embodiment of my invention, it will be appreciated that this has been done by way of illustration only.

I claim:

1. A container comprising a body of thermoplastic material, a cover of thermoplastic material, and hinge means joining said cover to said body, said cover and said body comprising box-like members of double-wall construction having interfitting hinge portions, each of said hinge portions having hinge pin bearing wall sections formed by abutting extended wall portions of said members, the thickness of said bearing wall sections being substantially twice the wall thickness of said members, and a hinge pin extending through said portions adjacent said bearing wall sections.

2. A pinned hinge container as set forth in claim 1, wherein said cover hinge portion fits within said body hinge portion, said cover hinge portion including a bearing wall section extending between a pair of hinge pin receiving wall sections on the body side of said hinge pin, and said body hinge portion including bearing wall sections extending from a pair of hinge pin receiving wall sections on the cover side of said hinge pin, the thickness of said bearing wall sections being substantially twice the wall thickness of said members.

3. A pinned hinge container as set forth in claim 2, wherein said cover hinge portion includes another double thickness bearing wall section extending between said hinge pin receiving wall sections thereof on the outer side of said hinge pin.

4. A pinned hinge container as set forth in claim 3, wherein said body hinge portion includes other double thickness bearing wall sections extending in opposite directions from said hinge pin receiving wall sections thereof on the outer side of said hinge pin.

5. A pinned hinge container as set forth in claim 1, wherein the outer end of said hinge pin is confined within said body.

6. In a container of thermoplastic material comprising box-like body and cover parts of hollow generally double wall construction joined by a pinned hinge, a hinge portion integral with one of said parts comprising abutting extensions of the walls thereof shaped to provide a hinge pin receiving channel having bottom and outer bearing wall sections each of a thickness substantially twice that of said walls of said one container part.

7. In a container having mating cover and body parts, a latch formed of thermoplastic material in a one-piece unitary construction comprising generally parallel anchor and latching bar portions and a pair of generally parallel side leg portions extending therebetween to provide a latching member of generally rectangular configuration, an anchor tab extending from said anchor bar portion toward said latching bar portion and a latching tab extending from said latching bar portion toward said anchor bar portion, means on one of said container parts receiving and retaining said anchor tab, and means on the other of said container parts releasably engaging the said latching tab.

8. The combination of claim 7, wherein said container parts also are of thermoplastic material, said means receiving said anchor tab comprising a pocket integral with one container part and extending between said side leg portions, said means engaging said latching tab comprising an undercut shoulder formed integral with said other container part and also extending between said side leg portions when engaged with said latching tab.

9. The combination set forth in claim 7, wherein said side leg portions and the outer faces of said anchor and latching bar portions generally lie in a first plane, and wherein said anchor and latching tabs extend in a second plane offset from and generally parallel to said first plane.

10. In a container comprising body and cover parts joined by a pinned hinge, at least one of said parts being of thermo-plastic material and of hollow generally double wall construction, a hinge portion integral with said one part comprising abutting extensions of the walls thereof formed to provide a hinge pin receiving wall and a hinge pin bearing wall extending from said receiving wall for bearing engagement against a hinge pin passing through said pin receiving wall.

11. A container comprising a body of thermoplastic material, a cover of thermoplastic material, and hinge means joining said cover to said body, said cover and said body comprising box-like members of double-wall construction having interfitting hinge portions, each of said hinge portions having hinge pin bearing wall sections formed by extending wall portions of said members positioned sufficiently close so as to behave as a single wall, and a hinge pin extending through said portions adjacent said bearing wall sections.

* * * * *